Figure 2:
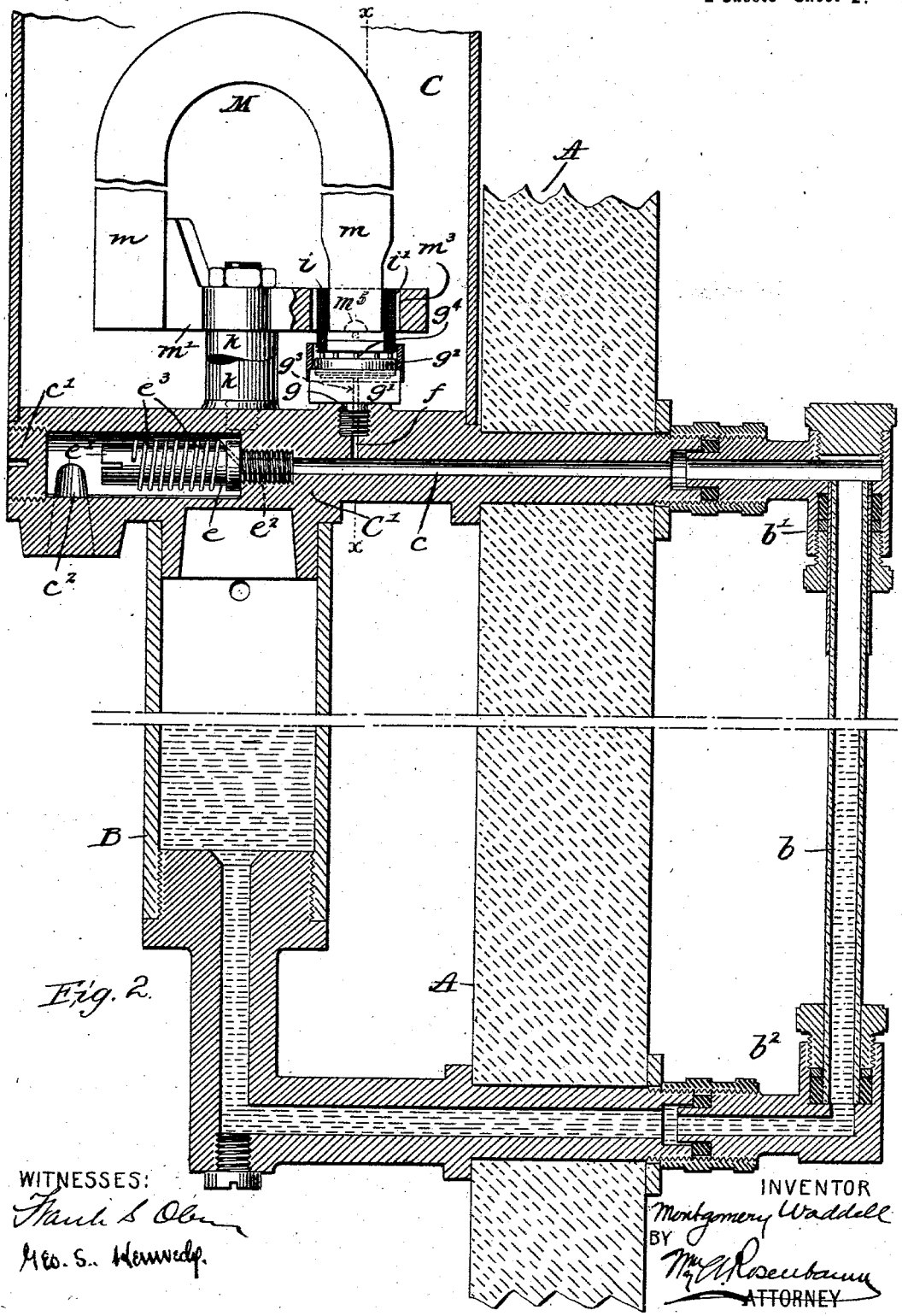

No. 634,487. Patented Oct. 10, 1899.
M. WADDELL.
ELECTRICAL INDICATOR.
(Application filed Jan. 10, 1899.)
(No Model.) 2 Sheets—Sheet 1.
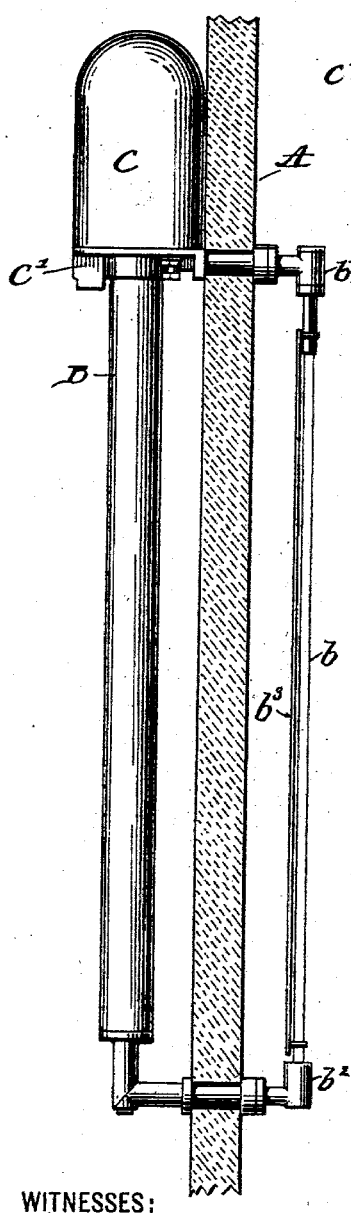
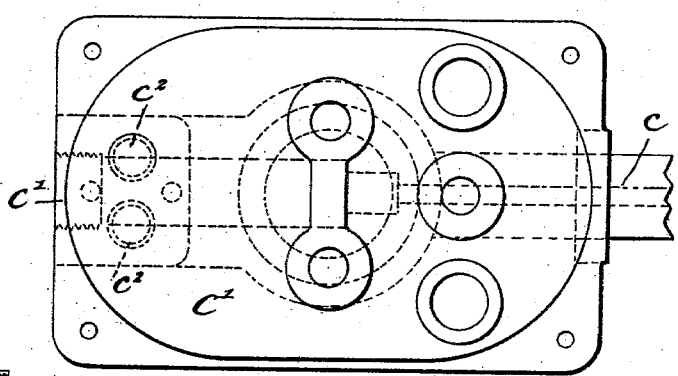
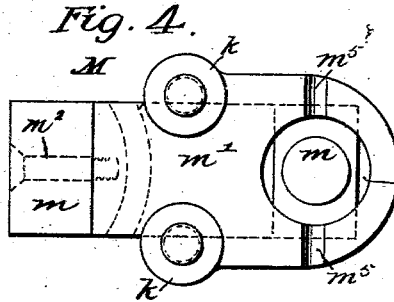
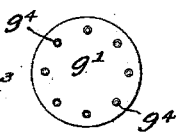
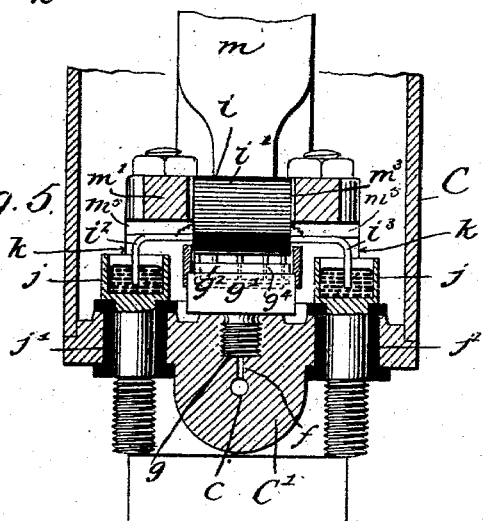
WITNESSES:
INVENTOR:
Montgomery Waddell
BY
ATTORNEY No. 634,487. Patented Oct. 10, 1899.
M. WADDELL.
ELECTRICAL INDICATOR.
(Application filed Jan. 10, 1899.)
(No Model.) 2 Sheets—Sheet 2.

WITNESSES:
Frank S. Ober
Geo. S. Hemwedy

INVENTOR
Montgomery Waddell
BY
Wm. Rosenbaum
ATTORNEY

THE NORRIS PETERS CO., PHOTO-LITHO., WASHINGTON, D. C.

UNITED STATES PATENT OFFICE.

MONTGOMERY WADDELL, OF NEW YORK, N. Y.

ELECTRICAL INDICATOR.

SPECIFICATION forming part of Letters Patent No. 634,487, dated October 10, 1899.

Application filed January 10, 1899. Serial No. 701,697. (No model.)

*To all whom it may concern:*

Be it known that I, MONTGOMERY WADDELL, a subject of the Queen of Great Britain, residing at the city of New York, in the borough of Manhattan and State of New York, have invented certain new and useful Improvements in Electrical Indicators, of which the following is a full, clear, and exact description.

This invention relates to electrical indicators or instruments whose function is to show at any time the condition of the current flowing in an electric circuit or circuits.

The object of the invention is to provide an instrument of this character in which there shall be, practically speaking, no movement of solid masses created directly by the current, thus eliminating at once many problems and difficulties which have hitherto proved to be obstacles to the production of accurately-operating instruments. In those instruments containing moving parts the weights of those parts, their inertia, the friction accompanying their motion, &c., must be allowed for, and with the changes wrought in such parts by differences in temperature it is quite difficult to construct such instruments to more than approximate accuracy. In the instrument I have invented there is, in theory, a moving part, but the motion is so slight, in fact, that it can scarcely be detected by the naked eye and is negligible as a factor in the production of an accurate instrument. The indicating element of the instrument herein described is a column of liquid, which is caused to rise and fall by differences of gas or air pressure, which differences are created in accordance with variations in the current whose condition is being indicated.

My improved indicator comprehends important details of construction, as well as certain novel and important principles, all of which will be fully described hereinafter and pointed out in the claims.

In the accompanying drawings, Figure 1 is a vertical section through a switchboard or other support, showing the instrument in side elevation. Fig. 2 is a vertical central section of the instrument with parts in elevation and other parts broken out. Fig. 3 is a plan of the base-plate supporting the magnet and controlling devices. Fig. 4 is a plan of the under side of the magnet. Fig. 5 is a section on line $xx$ of Fig. 2. Fig. 6 is a plan of the disk containing the air-escape ports.

Referring to the drawings by letter, let A represent a slab of slate or other material constituting the face of a station-switchboard or other adopted support for the instrument. In front of this and extending vertically is a glass tube $b$, similar to a gage-glass, supported between upper and lower couplings $b'$ $b^2$, respectively, and carrying a plate $b^3$, upon which a suitable scale is marked. A tube from the upper coupling extends through the support A into the base-plate C' of a dome C, while the lower coupling similarly connects through the plate A with the lower end of a stand-pipe B, whose upper end, for purposes of stability only, is attached to the under side of the base-plate C'. The stand-pipe and gage-glass contain water, oil, or other liquid, preferably colored to be easily observed in the glass and freely communicating through the lower coupling. The capacity of the stand-pipe compared with that of the gage is large, so that a displacement of the liquid in the gage will be accompanied by only a slight displacement of the liquid in the stand-pipe. The atmosphere is freely admitted above the liquid in the stand-pipe through suitable openings in the upper end of the latter.

Referring now to Fig. 2 for the construction of the base-plate C', it will be observed that the plate is of considerable thickness and containing a central internal passage $c$, extending from front to rear. At the front this passage connects with the passage through the tubular coupling $b'$. From this coupling it extends rearwardly to about the middle point of the plate, where it enlarges into a threaded cylindrical chamber of short length and then widens into a large chamber extending to the rear of the plate, where it is sealed by a plug $c'$. At the rear and passing upward from the under side of the base-plate are two conical passages $c^2 c^2$, leading into the large chamber. These are adapted to receive pipe-couplings, one of which connects by suitable tubing with a source of constant air or gas pressure, while the other may be plugged up or connected with another tube leading to another indicating instrument of a similar character, thereby providing for connecting a series of the instruments with the same source of air-pressure and insuring that the pressure in all the instruments will be practically the same, since the air-chambers of each are connected together. The intermediate or threaded portion of the air-chamber receives a threaded plug $e$, having a tailpiece $e'$, extending rearwardly nearly the entire length of the larger portion of the air-chamber, at which point it is fitted with a head adapted to receive a screw-driver, whereby it may be screwed into place in the threaded opening described and cut off communication between the front and rear portions of the passage $c$. This plug $e$ has an axial passage $e^2$ extending through its threaded portion only and in alinement at its forward end with the air-passage extending to the coupling $b'$. Into the rear end of this passage $e^2$ the end of a capillary tube $e^3$ projects, a suitable opening being made in the plug to admit the end of the tube and wherein it is hermetically sealed. The capillary tube is some eight or ten inches long in the ordinary instrument, and in order to confine it in a small space it is coiled around the tailpiece $e'$ of the plug, its free or rear end being open to admit the air in the chamber into it, whence it flows through passage $e^2$ in the plug and into the forward portion of the passage or chamber $c$. At $f$ is shown a vertical threaded passage extending from the chamber $c$ upward through the face of the base-plate. Into this is screwed a plug $g$, having an enlarged cylindrical head $g'$, slightly cup-shaped on its upper surface, into the cavity of which is fitted a disk $g^2$. The disk does not extend entirely to the bottom of the cavity in the plug, a space being left under it to serve as an air-chamber. This air-chamber communicates with the passage or chamber $c$ in the base-plate through a restricted axial passage $g^3$ in the plug. The disk is provided with a series of very restricted or capillary vertical passages $g$, arranged in a circle near its edge, the upper side of the disk having short nipples, through which these passages, respectively, lead. The upper surfaces of these nipples are trued off, so that a perfectly-smooth plate resting upon them would prevent the escape of air from the chamber beneath the disk and so from those passages with which the chamber connects. Resting upon this circle of nipples is a spool $i$, carrying a coil of wire $i'$, the axis of the spool being coincident with that of the disk beneath it and the end surface of the spool being provided with an accurately-formed flat smooth face to insure uniform contact with all of the nipples and a consequent accurate control of the escape or flow of air therethrough. The two terminals of the coil $i'$ connect, respectively, with metallic bent fingers $i^2$ $i^3$, which lead from the spool and turn down into mercury contact-cups $j$. These cups are formed or attached to the ends of binding-posts and pass through the base-plate, being suitably insulated therefrom by the bushings $j'$ and provided with clamping-nuts, to which the electrical conductors conveying the current whose condition is to be indicated are respectively connected.

Arranged above the base-plate is a permanent magnet M, consisting of an inverted, U-shaped piece $m$ of magnet-steel and a flat cross-piece $m'$ of gray iron, rigidly attached to one of the arms of the U-shaped part by the screws $m^2$ and extending thence toward and beyond the other arm thereof. In the free end of the part $m'$ a vertical circular opening $m^3$ is formed, through which projects the free arm of the part $m$, it being made cylindrical for this purpose and of smaller diameter than the opening to leave an annular armature-space between the two poles of the magnet. The extremity of the pole of the part $m$ is flush with the under surface of the part $m'$. This magnet structure is supported upon the base-plate C by means of brass spacing-studs $k$, which pass through ears in the part $m'$ of the magnet and into the solid metal of the base-plate, thus furnishing a rigid and magnetically-insulating support for the magnet.

The spool $i$ and its coil of wire $i'$ occupy the annular armature-space of the magnet, while the bent arms projecting into the mercury-cups pass out laterally through grooves $m^5$, formed on the under side of the part $m'$.

The operation is as follows: Let it be understood that a pump or reservoir is furnishing gas or air under approximately uniform pressure to the rear end of the chamber or passage $c$ through one of the openings $c^2$. This air or gas slowly forces its way through the capillary tube into the forward end of passage $c$, through the coupling $b$, and acts upon the surface of the liquid in the glass column, forcing the liquid down to a point depending upon the effective pressure of the air at the surface of the liquid. This point is predetermined as the zero-point of the scale, and the liquid in the glass column will always be at this point so long as no current flows through the coil $i'$. At the zero-point the upward pressure of the liquid exactly balances the pressure of the air. It may be stated here that the air in the forward portions of chamber or passage $c$ is, practically speaking, always subject to some leakage through the valve, the amount of such leakage when no current is flowing being dependent upon the size and weight of the valve and the pressure of air. This fact will therefore be a factor in fixing the zero-point of the scale. Now when the current whose condition as to strength, &c., is to be indicated is turned on it flows through the coil $i'$ in such a direction that when acted upon by the lines of force of the magnet M, concentrated in the armature-space, the tendency will be to lift the coil and its spool and uncover the nipples of the valve, so permitting the escape of air from the chamber $c$, thus reducing the pressure upon the liquid in the glass column and allowing it to rise to a point corresponding with the condition of the current flowing. An increase in the electric force, stress, or other condition of the current will lift the spool still higher, reducing the air-pressure further and permitting the liquid column to rise higher. A decrease in the current will allow the spool to fall back and permit the air-pressure to build up and send the liquid column down correspondingly. Thus the liquid column will always indicate the condition of the current flowing.

Now while I have referred to the movements of the coil and its spool as a "lifting-and-falling" operation the fact is that these movements are so slight that they not only can scarcely be detected by the naked eye, but require an extremely delicate instrument to measure them. Perhaps the best description of the operation of the air-valve is to say that the spool is caused to rest lighter or heavier upon the nipples, according as the current flowing through its coil is stronger or weaker. From a practical standpoint the spool does not break contact with the nipples, but in theory and in fact there is a film of air between the end of the spool and the surfaces of the nipples in thickness depending upon the strength of the current.

The function of the capillary tube $e^2$ is to act as a retarding device for the air between the source of air-pressure and the air-chamber whose pressure is controlled by the air-valve. The capillary tube being of very small diameter offers a high resistance to the flow of the air from the rear to the forward portions of the chamber $c$, and if an extraordinarily large amount of air be released from the forward part of said chamber by the valve nearly its entire effect will be felt by the liquid column, instead of a material portion of the effect being wasted in drawing air from the rear part of the passage $c$, connected directly with the source of air. This capillary tube also acts as a damper between the surface of the liquid column and the source of air-pressure, the sudden effect of impulses of air being thereby reduced. The function of the capillary tube being understood, it becomes obvious at once that other devices may be substituted for it. Hence my invention comprehends any construction of air-flow resistance.

The principle of this indicator is adapted for use in various ways. For instance, the current may be sent through the coil in the opposite direction, whereat increase of current through the coil would have the tendency to lower the spool or make it rest more heavily upon the nipples, which would give an increased air-pressure and a lowering of the liquid column. When operated in this way, the zero-point would have to be at the top of the liquid column, and the air-pressure at zero would be equal to the atmosphere. Again, the zero-point of the scale may be at an intermediate point of the column, so that when the instrument is used on a circuit in which the direction of current reverses, such as a storage-battery circuit, the discharging-current would be indicated on the scale above the zero-mark, due to the decrease of air-pressure, while the charging-current, which would be in the opposite direction, would be indicated on the scale below the zero-point, due to increase of air-pressure.

There are other ways of utilizing air or gas under pressure in this instrument without modifying its general construction. The drawings illustrate a dome C covering the magnet and valve mechanism. When the air flows out of the chamber $c$ through the valve to the atmosphere, this dome merely serves to protect the apparatus from dust and injury and will be provided at some point with a small hole to permit the escaping air to flow out and avoid back pressure. This dome, however, may be hermetically sealed and a suction-pump applied to it to exhaust the air therefrom and maintain a vacuum. Then by admitting atmospheric or any other pressure at the point $c^2$ the operation of the instrument will be substantially the same as before, except that the air will be drawn through the valve instead of forced through it. In either case there is a difference of pressure on the opposite sides of the valve, and this difference, which is controlled by the valve, determines the level of the liquid column. It may also be mentioned that the atmosphere may be excluded from the space above the liquid in the stand-pipe at the rear, in which event the gas-pressure on the indicating-column would be resisted only by the difference in weight of the two columns. That portion of the invention which relates to the altering of air or gas pressure in accordance with variations in the current may be supplied in an instrument whose indicating element is other than a liquid column—as, for instance, an ordinary air or gas pressure gage with an index.

The object in using the cross-piece $m'$ of the magnet is to concentrate all the lines of force of the magnet in the small armature-space occupied by the coil. I am thereby able to use less power in the coil and a small light spool. By the use of the mercury contacts the movements of the spool are not interfered with.

It is obvious that the main features of this instrument could be used in electrical measuring or recording instruments. Hence the claims herein are not limited in scope to electrical indicators.

The use of the word "air" in the claims is intended to cover any fluid medium suitable for the purpose.

Having described my invention, I claim—

1. The method of operating electrical indicators, which consists in determining the level of a liquid column by the flow of air or gas, and varying said flow in accordance with the variations of current.

2. In an electrical indicator, the combination of means for maintaining a difference of fluid-pressure, an indicating element subjected to said difference of fluid-pressure and whose position is determined by the fluid-pressure to which it is subjected, and means whereby said difference of fluid-pressure is varied in accordance with variations in the condition of the current being indicated.

3. In an electrical indicator, the combination of a column of liquid whose level indicates the condition of the current flowing, an air-supply acting upon the liquid to change its level, and means whereby the electric current varies the pressure of the supply of air, substantially as described.

4. In an electrical indicator, the combination of a column of liquid whose level indicates the condition of the current flowing, an air-supply acting upon the liquid to change its level and a valve controlling the pressure of the supply of air said valve being operated by variations in the current flowing, substantially as described.

5. In an electrical indicator, the combination of a column of liquid whose level indicates the condition of the current flowing, an air-supply acting upon the liquid to change its level, a valve controlling the pressure of the supply, a coil of wire through which the indicated current flows, a magnetic field of force in which said coil is located, said valve being controlled by the movements of said coil substantially as described.

6. In an electrical indicator, the combination of an indicating element, an air-supply actuating the same and means whereby the electric current varies the pressure of the air supplied, substantially as described.

7. In an electrical indicator, the combination of an indicating element, an air-supply actuating the same and a valve controlling the pressure of the supply of air, said valve being operated by variations in the current flowing, substantially as described.

8. In an electrical indicator, the combination of an indicating element, an air-supply actuating the same, a valve controlling the pressure of the supplied air, a coil of wire through which the indicated current flows, a magnetic field of force in which said coil is located, said valve being controlled by the movements of said coil, substantially as described.

9. In an electrical indicator, the combination of an indicating element, an air-supply actuating the same, and an air-flow resistance through which the air passes, substantially as described.

10. In an electrical indicator, the combination of an indicating element, an air-supply actuating the same, an air-flow resistance through which the air passes and a pressure-controlling device actuated by the indicated current and acting upon the air between the air-flow resistance and the indicating element, substantially as described.

11. In an electrical indicator, the combination of a column of liquid whose level is the indicating element, a source of air-pressure acting upon the liquid to change its level, an air-flow resistance between the air source and the liquid, and an air-escape valve controlled by the current and located between the controlling device and the liquid, substantially as described.

12. In an electrical indicator, the combination of an indicating element, an air-supply actuating the same, a capillary tube through which the air passes and a pressure-controlling device actuated by the indicated current and acting upon the air between the capillary tube and the indicating element, substantially as described.

13. In an electrical indicator, the combination of an indicating-column of liquid, a source of air-pressure acting upon said liquid, a capillary tube through which the air passes to reach the liquid column, and an electrically-operated air-escape valve located between the capillary tube and the liquid, substantially as described.

14. In an electrical indicator, the combination of a U-shaped tube containing a liquid, means for admitting air under pressure against the surface of the liquid in one leg of the tube, and an electrically-controlled valve for adjusting the air-pressure.

15. In an electrical indicator, the combination of air under pressure controlling the indicating element, a valve controlling the pressure of air, said valve consisting of a disk having a series of perforations through it, and a cover-plate resting upon the disk and closing said perforations and adapted to be moved by the current whose condition is being indicated.

16. In an electrical indicator, the combination of air under pressure controlling the indicating element, a valve controlling the pressure of air, said valve consisting of a disk having a series of perforations through it and arranged in a circle, a spool carrying a coil through which the indicated current flows and which is subjected to the influence of a magnetic field, said spool carrying a flat circular surface adapted to impinge upon said disk to control the perforations therein, substantially as described.

17. In an electrical indicator, the combination of an indicating element consisting of a U-shaped tube, the legs of which are of different diameters or capacities and contain a liquid, and electrically-operated means for changing the level of the liquid in the smaller leg, substantially as described.

In witness whereof I subscribe my signature in presence of two witnesses.

MONTGOMERY WADDELL.

Witnesses:
WM. A. ROSENBAUM,
FRANK S. OBER.